(12) United States Patent
Johnson et al.

(10) Patent No.: US 11,987,889 B2
(45) Date of Patent: May 21, 2024

(54) BORING BIT COMPONENT WITH HARD FACE WEAR RESISTANCE MATERIAL WITH SUBSEQUENT HEAT TREATMENT

(71) Applicants: Keith A. Johnson, West Bend, WI (US); Andrew J. Theisen, Fond du Lac, WI (US); Mark More, West Bend, WI (US); Casey Placek, Van Dyne, WI (US)

(72) Inventors: Keith A. Johnson, West Bend, WI (US); Andrew J. Theisen, Fond du Lac, WI (US); Mark More, West Bend, WI (US); Casey Placek, Van Dyne, WI (US)

(73) Assignee: Kondex Corporation, Lomira, WI (US)

( * ) Notice: Subject to any disclaimer, the term of this patent is extended or adjusted under 35 U.S.C. 154(b) by 854 days.

(21) Appl. No.: 16/833,555

(22) Filed: Mar. 28, 2020

(65) Prior Publication Data

US 2020/0325584 A1 Oct. 15, 2020

Related U.S. Application Data

(60) Provisional application No. 62/833,283, filed on Apr. 12, 2019.

(51) Int. Cl.
*C23C 26/00* (2006.01)
*C21D 9/22* (2006.01)
(Continued)

(52) U.S. Cl.
CPC ............ *C23C 26/00* (2013.01); *C21D 9/22* (2013.01); *C22F 1/10* (2013.01); *C22F 1/18* (2013.01); *E21B 7/046* (2013.01); *E21B 10/46* (2013.01)

(58) Field of Classification Search
CPC .......... C23C 26/00; C23C 24/10; C21D 9/22; C22F 1/10; C22F 1/18; E21B 7/046; E21B 10/46; B23K 26/34; B23K 31/025
See application file for complete search history.

(56) References Cited

U.S. PATENT DOCUMENTS

| 1,660,988 A | 2/1928 | Butler |
| 3,871,836 A | 3/1975 | Polk et al. |

(Continued)

FOREIGN PATENT DOCUMENTS

| AU | 2001288875 B2 | 3/2002 |
| JP | 5975697 B2 | 8/2016 |
| WO | 2019/070639 A1 | 4/2019 |

OTHER PUBLICATIONS

U.S. Appl. No. 62/566,796, Johnson et al., filed Oct. 2, 2017.
U.S. Appl. No. 16/836,175, Johnson et al., filed Mar. 31, 2020.

*Primary Examiner* — Anthony M Liang
*Assistant Examiner* — Danny N Kang
(74) *Attorney, Agent, or Firm* — Reinhart Boerner Van Deuren P.C.

(57) ABSTRACT

A boring bit or other component for horizontal directional drilling is provided which includes a hard faced layer that is preferably made by a laser cladding bead. A subsequent or post heat treatment is applied to modify the heat affected zone (HAZ) to eliminate or reduce the hard brittle regions and/or softer regions in the base iron or steel material of the HAZ. Further, the hard faced layer may be applied in combination with carbide insert teeth that are embedded within the steel base of the boring bit body, such as by press fitting.

27 Claims, 9 Drawing Sheets

(51) Int. Cl.
  *C22F 1/10* (2006.01)
  *C22F 1/18* (2006.01)
  *E21B 7/04* (2006.01)
  *E21B 10/46* (2006.01)

(56) References Cited

U.S. PATENT DOCUMENTS

| | | |
|---|---|---|
| RE29,989 E | 5/1979 | Polk et al. |
| 4,694,918 A | 9/1987 | Hall |
| 4,726,432 A | 2/1988 | Scott et al. |
| 5,868,047 A * | 2/1999 | Faust .................. B25B 23/1415 81/438 |
| 6,039,127 A | 3/2000 | Myers |
| 6,390,087 B1 | 5/2002 | Wentworth et al. |
| 6,450,269 B1 | 9/2002 | Wentworth et al. |
| 6,588,515 B2 | 7/2003 | Wentworth et al. |
| 6,615,936 B1 | 9/2003 | Mourik et al. |
| 6,789,635 B2 | 9/2004 | Wentworth et al. |
| 6,887,586 B2 | 5/2005 | Pecker et al. |
| 2003/0024741 A1 | 2/2003 | Wentworth et al. |
| 2006/0021800 A1 | 2/2006 | Beuerschausen et al. |
| 2007/0079992 A1 | 4/2007 | Curry et al. |
| 2010/0065337 A1 | 3/2010 | Luce et al. |
| 2010/0078227 A1 | 4/2010 | Buske et al. |
| 2010/0175926 A1 | 7/2010 | Buske et al. |
| 2011/0318129 A1 | 12/2011 | Piper |
| 2012/0067651 A1 | 3/2012 | Xia et al. |
| 2013/0099553 A1 | 4/2013 | Krauter |
| 2015/0114199 A1 | 4/2015 | Shepard et al. |
| 2015/0122552 A1 | 5/2015 | Wang et al. |
| 2015/0258628 A1 | 9/2015 | Flak et al. |
| 2016/0157423 A1 | 6/2016 | Stoffel et al. |
| 2016/0258223 A1 | 9/2016 | Uhlenberg et al. |
| 2017/0198577 A1 | 7/2017 | Steinmetz et al. |
| 2018/0202233 A1 | 7/2018 | Cleboski et al. |
| 2020/0325584 A1 | 10/2020 | Johnson et al. |

* cited by examiner

ID/BORING BIT COMPONENT WITH HARD
FACE WEAR RESISTANCE MATERIAL
WITH SUBSEQUENT HEAT TREATMENT

CROSS-REFERENCE TO RELATED PATENT
APPLICATIONS

This patent application claims the benefit of U.S. Provisional Patent Application No. 62/833,283, filed Apr. 12, 2019, the entire teachings and disclosure of which are incorporated herein by reference thereto.

FIELD OF THE INVENTION

The present invention generally relates to horizontal directional drilling (HDD) components (e.g. boring bits, collars, shafts) for using cutting, scraping and/or boring applications, and more particularly relates to wear resistant coatings for bits such as a boring bit component for increasing durability and/or prolonging lifespan.

BACKGROUND OF THE INVENTION

Horizontal directional drilling (HDD) is rapidly gaining popularity in the construction industry. Typically, infrastructure such as cables, wires, and small conduit are placed using an excavator and trenching system. The key motivators for the HDD preference are environmental and efficiency considerations. It is possible to implement the same infrastructure quicker, cheaper, and with less environmental impact utilizing modern HDD equipment and techniques.

Horizontal directional drilling is achieved by first starting an angled bore hole into the earth. Several components work in tandem to move and excavate the hole, but the main tool at the end of the drill is known as a boring bit. The bit prescribed for the job is dependent upon the main equipment, substrate media and infrastructure type. The bit is paramount to the efficiency of the bore, as the bit is primarily responsible for the cutting, extracting, and steering. The bit is steered to the desired depth and around any obstructions encountered using sonar. Sonar tracking is required above ground all the way to the end location. The bit is then steered back towards the surface where it exits the ground creating the first "pilot" hole. If the pilot hole is large enough the infrastructure can be installed immediately after, else reaming bits are used to enlarge the bore to the appropriate diameter before the infrastructure is placed.

Attempts or proposals have been made by others (e.g. see U.S. Pat. No. 6,789,635 referenced below), unsuccessfully or only partially successfully, to enhance the life of the current bit design through the use of larger carbide inserts or weld-on hard facing. These methods have sometimes been found to be inferior to the original design due to inserts coming loose, and weld-on hard facing being softer than the original base material. For example weld-on hard facing may be applied to substantially the entire bit surface, which carries considerable application expense, however, the heat associated with weld-on hard facing applications does not readily permit application close to or over the top of carbide inserts, due to the fact that the heat would otherwise readily degrade the carbide inserts. Accordingly, such weld-on hard facing would need to be typically be spaced from carbide inserts sufficiently to avoid carbide insert degradation, however, that would expose an erosion zone of the base steel material of the bit immediately around the carbide inserts, increasingly the likelihood of such inserts coming loose.

Such examples of prior boring bits are exemplified in the following patent records: U.S. Pat. Nos. 6,390,087 and 6,588,515 to Wentworth et al., entitled "Drill bit for directional drilling"; U.S. Pat. No. 6,450,269 to Wentworth et al. entitled "Method and bit for directional horizontal drilling"; and U.S. Pat. No. 6,789,635 to Wentworth et al. entitled "Drill bit for directional drilling in cobble formations", with the entire disclosure of each of the patent records being incorporated by reference in their entireties as the present invention is applicable to improving upon and can be applied to the boring bit designs shown and described in these patent records, and coverage over such conventional bit designs with the improvements disclosed and claimed herein is intended. For example, each of these boring bits include a boring bit body comprising steel material to provide a first hardness. As is typical, the boring bit body comprise a mounting base portion in the form of a chuckable end comprising a threaded socket or projection, clamp, a splined opening and/or other attachment surface configured to facilitate connection to a rotary actuator for transmission of rotational force; and an engagement bit portion configured for boring engagement in an earth substrate material. The engagement bit portion extends axially forward from the mounting base portion about a central travel axis and defines a leading region and a trailing region, with the trailing region being disposed rotationally behind the leading region relative to the central travel axis, when the bit is rotated in a first rotational direction during use.

In greater detail, these patent publications also generally demonstrate that such boring bit examples may also comprise: (a) a front thrust surface distal from the mounting base portion and facing away from the mounting base portion; (b) an inner radial surface facing toward the central axis and extending between the front thrust surface and the mounting base portion; (c) an outer radial surface facing away from the central axis and extending between the front thrust surface and the mounting base portion, with the front thrust surface extending radially between the inner radial surface and the outer radial surface; (d) a leading face arranged frontally along the leading region relative to the predetermined rotation, with the leading face extending radially outward from the inner radial surface to the outer radial surface; and (d) trailing face spaced behind the leading face and arranged rearward along the trailing region relative to the predetermined rotation, with the trailing face extending radially outward from the inner radial surface to the outer radial surface.

Also, US 2013/0099553 to Krauter discloses another larger bit wherein cutter insert gum modification is provided for treating a cutter tool adapted to be used in tunnel boring operations. According to Krauter's summarized disclosure, cutting elements are inserted into cavity regions. The tool may then be heated treated by heating the cutter tool to approximately 350-650 degrees Fahrenheit. Thereafter, a laser cladding process is conducted whereby an alloy powder is applied to a cutter tool outer or gum surface adjacent to the cutting elements. However, the cladding appears to be limited to gum regions in Krauter with concerns about overheating the cutting elements.

These aforementioned patent publication records general demonstrate the attempts and examples of using carbide cutting teeth inserts in bits such as along at least the leading face and/or front thrust surface for engagements and wear resistance. Further, the '635 patent also describes: "in another configuration, a layer of wear resistant hard metal is applied by welding to the leading side surface and/or engagement front end face".

As best understood, current HDD component product offerings such as boring bits are heat treated and then subsequently hard faced via hard faced welding including carbide particles. While this provides enhanced protection at the hard face, the inventors have realized issues that these present for which solutions are provided. As such, improvements over the state of the art are presented herein.

BRIEF SUMMARY OF THE INVENTION

An aspect of the present invention is related to hard facing a horizontal directional drilling (HDD) component (e.g. a HDD boring bit, or shaft or collar or the like for use therewith) as the first step (preferably with laser cladding) with subsequent heat treating. It has been recognized that the welding hard facing materials currently used in the market do not allow for the described manufacturing sequence of heat treating second.

It is contemplated that this may be for various reasons including the matrix material used, voids created during welding of hard facing, and/or poor fusion of welding away from the center of application at the edges. Heat treatment may be problematic. Also, using a press fit arrangement for carbide teeth inserts as opposed to brazing or welding techniques is disclosed with a post heat treatment. As carbide teeth inserts are often used, press-fitting of such inserts is preferred when post heat treatment is applied to avoid possible integrity issues with welding or brazing. The heat affected zone (HAZ) created by prior weld hard facing applications appears to create softer regions and harder regions in the parent material (e.g. steel base material, with the softer and harder being relative to the hardness of the base steel material) which may be problematic in that hard regions in the HAZ may be brittle and prone to cracking whereas softer regions may be prone to quicker wear. Laser cladding is preferred for hard facing as smaller and higher percentage of carbide particles may be embedded in the matrix, fewer voids and better fusion at edges that should hold up better to post heat treatment. Due to the types of materials that can be imparted on the product such as through laser cladding in a preferred embodiment (but not limited thereto), a method for production involves heat treat after hard facing thus creating a consistent microstructure and hardness in the base part. From investigation, it appears that current offerings have a high heat input for hard face welding which creates a tempered layer under and around the hard facing which results in undesired wear.

Accordingly, one aspect is directed toward a method for hardening a horizontal directional drilling (HDD) component, comprising: hard facing the horizontal directional drilling (HDD) component at a region thereof; and then subsequently heat treating the hard faced horizontal directional drilling (HDD) component.

The method to create the hard facing may comprise melting the base material with a laser to form a melt pool; depositing a stream of particles of the clad material into the melt pool; and solidifying the melt pool to affix the particles of the clad material.

The hard facing in some embodiments may create a heat affected zone (HAZ) in a steel base material of the horizontal directional drilling (HDD) component. Advantageously, the heat treating by being conducted after the hard face application can remove the heat affected zone (HAZ).

Preferably, the hard facing comprises a laser clad hard face coating, but can also involve plasma transferred arc (PTA) hard facing, a welded hard face coating, and/or a mechanically bonded coating. All of these options can feature a coating hardness that is preferably greater than 50 HRC. Optionally and preferably, carbide inserts also having a hardness of greater than 50 HRC may be brazed or welded onto specific regions. However, it is contemplated that post-heat treatment may affect integrity of such carbide inserts, such that more preferably that such carbide inserts (e.g. carbide teeth inserts) are mechanically press fitted into the steel base material of the bit.

One preferred way to make the hard face coating for subsequent heat treatment comprises a bonding matrix primarily of nickel and tungsten. Using primarily nickel is most preferred as it should not degrade in subsequent heat treatment operations.

The heat treatment can comprise one or more of the following: an austemper heat treatment (preferably creating a microstructure that is primarily bainitic having a hardness within the range of 35-65 HRC); a Martemper or Marquench (preferably creating a microstructure that is primarily tempered martensite with bainitic formations possible having a hardness within the range of 35-65 HRC); and/or a quench and temper (preferably creating primarily tempered martensite having a hardness within the range of 35-65 HRC). Structures may be produced that are ductile in nature in the iron base material or base steel material after the heat treatment.

In some embodiments, the hard facing is covering (seat belting) a carbide insert mounted in a steel base material of the horizontal directional drilling (HDD) component. In other embodiments, the steel base material is free of carbide teeth inserts.

An aspect of the present invention may also be related to a horizontal directional drilling (HDD) component manufactured whereby hard facing is applied before a heat treatment application. According to this configuration, soft connection spots in the base steel material may be avoided, preventing premature loss of material due to soft spots.

Another feature that may be used is that the hard face layer is formed from a bead of laser cladding, comprising at least one of the following materials: tungsten carbide, titanium carbide, iron carbide, diamond, ceramic, and other material having a Vickers scale hardness between HV 1000-2500.

Another feature that may be used is that second material of the hard face layer comprises a plurality of particles deposited into the first material in a melt pool portion of the first material, with the first material comprising steel material. The particles that have been deposited into the base material in the melt pool have solidified to form a metallurgical bond with the base material in a dilution zone, with the particles having an average size of between 40 and 110 μm. The particles are deposited into the steel material with the dilution zone comprised of a mixture of particles and the steel material, with the dilution zone being less than 0.3 mm thick. For example, the particles may comprise at least one of the following materials: tungsten carbide, titanium carbide, iron carbide, diamond, ceramic, Nickel, Chromium, Carbon, Silicon, Boron, and other material having a Vickers scale hardness between HV 1000-2500.

Another feature that may be used is that boring bit is an originally manufactured, non-rebuilt bit.

Another feature that may be used is a method of laser cladding a bead of material to form the hard face layer on the boring bit body to integrally bond the hard face layer to the boring bit body.

Various advantages may be realized. For example, the hard facing may be used on selective regions to reduce leading edge wear. This can be an attempt to keep the edge more square and "sharper" to maintain high pressure forces and maintain hole size.

Design features can allow pullback reducing or eliminating risk of breaking or sticking.

Anti-shear feature can be provided that allow something other than the bolts to take force from rotation and push.

The process in some embodiments may be for "seat belting" for longer carbide retention when carbide inserts are first installed into a base steel material.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present application may relate to further improvements over Thiessen, filed as U.S. Provisional Patent Application 62/566,796 filed Oct. 2, 2017, and the corresponding PCT application filed thereon as Application Serial No. PCT/US18/53861 filed on Oct. 2, 2018 and entitled "Boring Bit or Other Bit with Hard Face Wear Resistance Material", the disclosures of which are hereby incorporated by reference in their entirety.

In particular, in an embodiment, any of the HDD boring bits illustrated or described in connection with ay of FIGS. 1-14 may be additionally subjected to the sequential processing of FIG. 15, whereby first a hard facing a horizontal directional drilling (HDD) component part (e.g. a HDD boring bit, or shaft or collar or the like for use therewith) is provided 300. That provided component typically includes a non-heated component part comprising steel base material, although optionally heat treating may additionally be done beforehand.

Then, at select region (all or part of the component), the provided HDD component part is subjected to a hard face (302) treatment. Preferably, this is laser cladding but may also alternatively be in other embodiments other hard face treatment such as PTA hard face coating, welded hard face coating, or mechanically bonded coating.

Subsequently then, the HDD component part is subject to a heat treat 304. Preferably the heat treat 304 is an austemper heat treatment, although it may alternatively involve a martemper or marquench, or a quench and temper.

Figure 8:
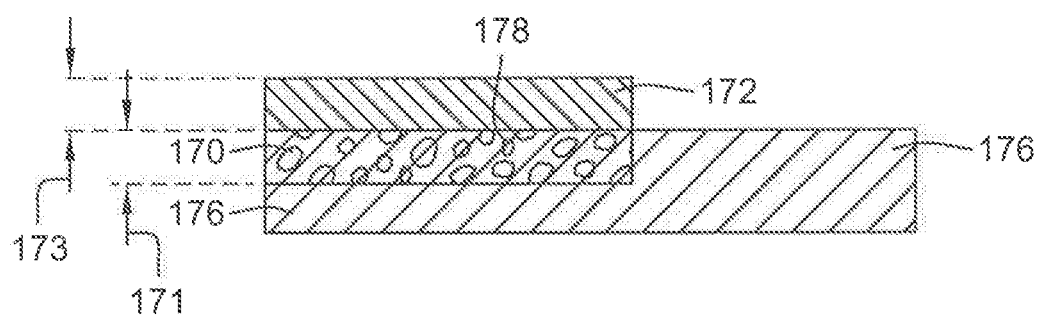
FIG. 8 is a schematic cross section taken through normal through the cladded surface of the boring bit, resulting from the laser cladding application as shown in FIG. 7.

In the second hard face 302 step, a heat affected zone (HAZ) may develop providing a softer layer of the base iron or steel material immediately adjacent and abutting the hard face coating (e.g. see the region of 176 in FIG. 8 that abuts 170. By heat treating after the hard face, an additional benefit is realized that HAZ and softer layer of the base iron or steel material may be realized, especially as compared with hard face weld applications.

To better provide for integrity of the hard face, the matrix for the hard face coating can comprise primarily (by weight percentage) of nickel and/or tungsten, that serves to bond with iron base material or the steel base material. Preferably in an embodiment, primarily nickel is used in the bonding matrix. When "primarily" is used herein with any term, it meant by comparison weight percentage and greater than 50% by weight percentage. Carbide particles may be embedded and preferably smaller particles than those achievable via welding applications. For example, herein particles 178 of the clad material 102 preferably have an average size of between 40 μm and 250 μm and more preferably between 44

μm and 105 μm. In another embodiment, amorphous cladding may be applied with hard particles precipitating during the process.

A description of more particular embodiments that may employ the treatment process of FIG. 15 will now be described understanding that in this application, the treatment process described above for FIG. 15 has been applied to the below embodiments, with subsequent heat treating after application of hard face, preferably by laser cladding. Turning then to a first embodiment of the present invention shown in FIGS. 1-5, a boring bit 10 is illustrated that comprises a hard face layer 12 (and preferably a laser cladding type hard face layer) over a boring bit body 14.

The boring bit body 14 comprises a first material having a first hardness such as steel material (or alternatively iron material) which is conventionally used in such boring bits. The hard face layer has a significantly greater second hardness than the base material of the boring bit body. As shown, the boring bit body 14 generally comprises a mounting base portion 16 and an engagement bit portion 18, which in this embodiment is in the form of an arcuate bit portion having an arch shaped segment.

The mounting base portion facilitates attachment and mounting to a suitable axial drive and rotary actuator, such as a releasable connection to boring machinery such as horizontal directional drilling equipment. Typically the boring bit comprises a chuckable end that comprises such things as a clamp, splined bore, threaded socket or threaded projection, or other attachment surface that is configured to facilitate releasable connection to a rotary actuator for transmission of rotational force.

The engagement bit portion 18 is configured for boring engagement in an earth substrate material to create the bore therethrough. The engagement bit portion 18 extends axially forward from the mounting base portion 16 about a central travel axis 20. Generally, the engagement bit portion 18 defines a leading region 22 that is arranged at the leading surface that initially engages the earth material during rotation, and a trailing region 24 that is disposed rotationally behind the leading region relative to the central travel axis. When the boring bit is rotated in its normal direction about the central travel axis 20, the leading region 22 will first engage and cut against the earth substrate to be followed by the trailing region 24.

The hard faced layer 12 is integrally bonded to the boring bit body 14 over the steel base material thereof. As schematically indicated in FIGS. 1-5, the hard faced layer 12 is preferably applied to both of the leading region 22 as well as the trailing region 24. However, preferably the hard faced layer 12 comprises a greater coverage over the leading region 22 as compared to the trailing region 24 (however both regions may also have the same average thickness on at least the outer radial surface as shown in the alternative embodiment of FIG. 6). For example the leading region 22 with greater coverage is indicated in the region rotationally forward of the juncture 23, while the trailing region 24 behind the juncture 24 has less coverage at least on the inner radial surface, and also in some embodiments also on the outer radial surface, such as shown in FIGS. 1-5.

Juncture 23 is illustrated to demark the more heavily covered leading region 22 of hard facing material from the less covered trailing region 24 of hard facing material. However, juncture 23 may not be located exactly at the middle location between leading and trailing faces (preferably juncture is located proximate the middle, such as within 10% of the middle angular location between leading and trailing faces, see e.g. FIG. 3). The juncture 23 (also referred to as demarcation or line) between the leading and trailing region as shown for example in FIG. 3 can therefore be characterized as proximate the angular midpoint of the angular span of the boring bit 14, which generally forms an arc shaped segment in an embodiment.

Embodiments of the present invention contemplate regions of greater and lighter coverage proximate leading and trailing edges, which may either mean thicker coverage or longer regions of coverage, more preferably both thicker coverage and longer regions of coverage as illustrated and discussed herein.

For example, the hard faced layer 12 can define an average thickness that extends normal to the boring bit surface (see e.g. examples of FIGS. 7-11 demonstrating such additional thickness created by laser cladding). The average thickness of hard facing material is greater along the leading region 22 as compared to the trailing region 24.

For example, the average thickness of the leading region 22 may be between 2 mm and 6 mm while the average thickness over the trailing region may be between 1 mm and 3 mm. Further, the average thickness over the leading region 22 is at least 1 mm thickness than the average thickness of the trailing region 24. This places additional hard face material proximate to the more wear prone areas that are in the leading region as opposed to the trailing region. However, the trailing region is also protected but just simply not as great as the leading region as the leading region is subject to greater engagement or wear during use.

To provide additional reference, a typical boring bit geometry demonstrated by the boring bit 10 will be provided below. The boring bit comprises a front thrust surface 26 that is arranged at the end opposite the mounting base portion 16 and faces away from the mounting base portion 16. This is the portion of the boring bit body 14 that engages against "the bottom" of the bore being formed and thus encourages substantial amounts of compressive loads and frictional engagement thereon.

Additionally, there is an inner radial surface 28 that faces toward the central axis 20 and extends between the front thrust surface 26 and the mounting base portion 16. This surface is more protected in that it does not face directly either the bottom or generally cylindrical wall of the bore being formed in the earth substrate. Further, there is an outer radial surface 30 that faces away from the central axis and generally along the exterior of the boring bit body 14. The outer radial surface 30 extends between the front thrust surface 26 and the mounting base portion 16. The front thrust surface 26 is then shown to extend radially between the interior of the inner radial surface 28 and the exterior provided by the outer radial surface 30. As apparent, the outer radial surface 30 will thus be facing outwardly and at least along part of the length in potential engagement with the generally cylindrical wall being formed in the earth substrate. However, the boring bit body 14 is tapered radially outwardly a bit as the boring bit body extends away from the mounting base portion such that the outer radial surface 30 is subject to most of the engagement proximate the front thrust surface 26 when in operation.

Further, a leading face 32 is arranged frontally along the leading region 22 relative to the predetermined rotation around the central travel axis 20 when the boring bit is moved in one direction rotationally. The leading face 32 extends radially outward from the inner radial surface 28 to the outer radial surface 30. This leading face 32 may thus impact directly and engage with earth material to scrape in combination with the front thrust surface 26. Further there is a trailing face 34 that is spaced behind the leading face 32 and arranged rearward along the trailing region 24 relative to the predetermined rotation of the boring bit when rotated in one direction. The trailing face 34 extends radially outward from the inner radial surface 28 to the outer radial surface 30 much like the leading face 32, except that the trailing face 34 follows the leading face 32 during engagement and is thus not positioned to engage substantially when rotated in the predetermined rotational direction. However, when the bit is reversed whether temporarily or otherwise, the trailing face may still incur impact. For example if the bit gets stuck or is in difficult substrate it may be desired to temporarily reverse rotation however, typically the bit still has a predetermined rotation about the travel axis that is considered to be that direction that is used for normal cutting operations (as such "a predetermined rotation" is broad enough to encompass situations where the bit is reversed or backed out such as the instances as noted above).

With this understanding, it can be seen that the front thrust surface 26 is located at an axially front-most location farthest away from the mounting base portion 16 and that faces away from the mounting base portion 16. As a result, an intermediate region 36 is provided that extends from the front thrust surface to the mounting base portion and thus may comprise the inner radial surface 28, the outer radial surface 30, the leading face 32 and the trailing face 34.

Another aspect of providing greater coverage proximate the leading and trailing edges is realized in that the hard faced layer is shown to extend from the front thrust surface toward the mounting base portion at a greater average axial length along the leading region 22 as compared to the trailing region 24 over this intermediate region 36.

Most preferably, and as shown in the schematic example, the hard faced layer 12 is applied over at least portions of each of the front thrust surface 26, the inner radial surface 28, the outer radial surface 30, the leading face 32 and the trailing face 34.

Preferably, the hard face layer covers the entire front thrust surface 26, or at least substantially covers the front thrust surface (e.g. at least 90%), but to avoid extra expense and unnecessary hard face covering, a significant advantage is realized in that the hard faced layer 12 may only cover less than 40% of the intermediate region 36. This also results in less time being required to make the bit such as with laser cladding that requires traversal of a laser cladding tool about the surface of the bit (see e.g. FIGS. 7-11).

Figure 4:
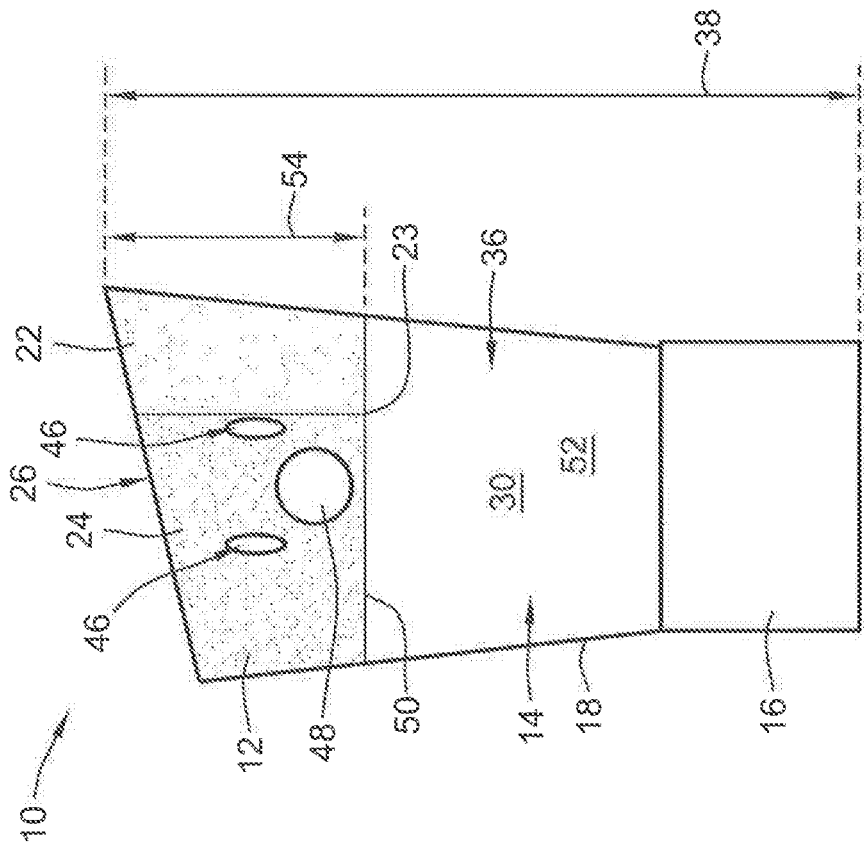
FIG. 4 is a partly schematic side view of the boring bit as shown in FIG. 1 similar to FIG. 2 but with the bit rotated relative to FIG. 2.
Figure 5:
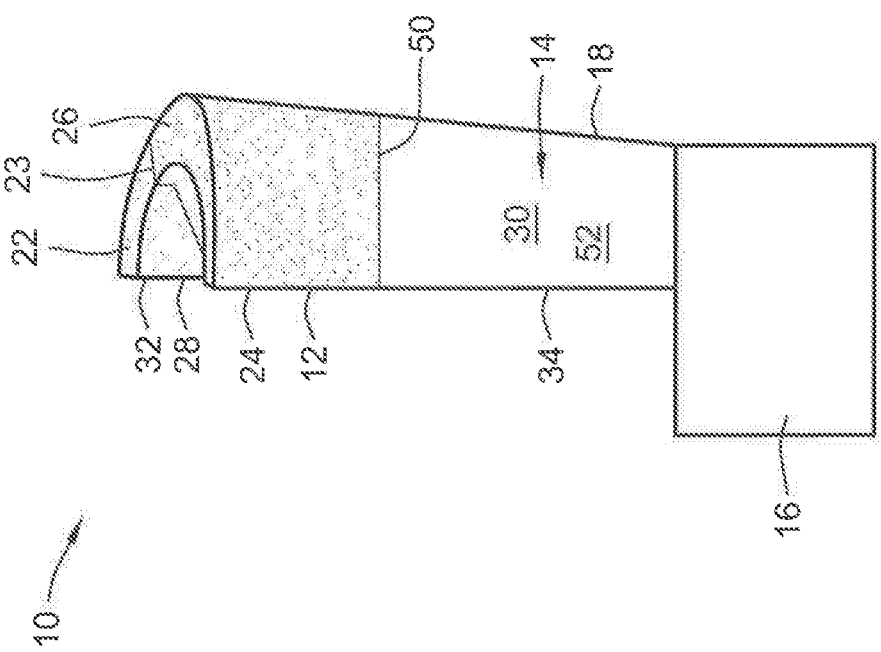
FIG. 5 is another partly schematic side view of the boring bit shown in FIG. 1 and similar to the side view shown in FIG. 2 but with the boring bit rotated relative to the side views shown in FIGS. 2 and 4.

Also preferably and as illustrated, the hard faced layer 12 is deposited on both the inner radial surface 28 as well as the outer radial surface 30. As illustrated best in FIG. 2, the inner radial surface defines an inner coverage area of the hard faced layer 12, and as shown in FIGS. 4 and 5 the outer radial surface defines an outer coverage area of the hard faced layer. Preferably, the inner coverage area is much less than that of the outer coverage area. For example, the inner coverage area may be less than 50% of hard faced layer area coverage than that of the outer coverage area and more typically it will be closer to 15%-30% perhaps even more closely to 20%-25%. Further, it can be seen that the coverage on the inner radial surface 28 may be limited to immediately proximate the front thrust surface 26 such that the cost and expense of the hard faced layer is applied to the region which is anticipated to have most wear along the inner radial surface. The remainder of the inner radial surface may therefore be uncovered thereby creating substantial cost and tool making time savings, especially with respect to laser cladding which is applied at a relatively narrow width as compared with mass application hard facings.

Further, the entire boring bit body need not be covered with the hard faced material 12 as illustrated in each of the FIGS. of FIGS. 1-6, for example, if the bit defines a maximum axial span as indicated at 38, the hard faced layer may extend continuously and substantially complete coverage over the leading face 32 from the front thrust surface for protection of the leading face, a leading axial length 40 of between 25% and 45% of the maximum axial span 38.

Figure 1:
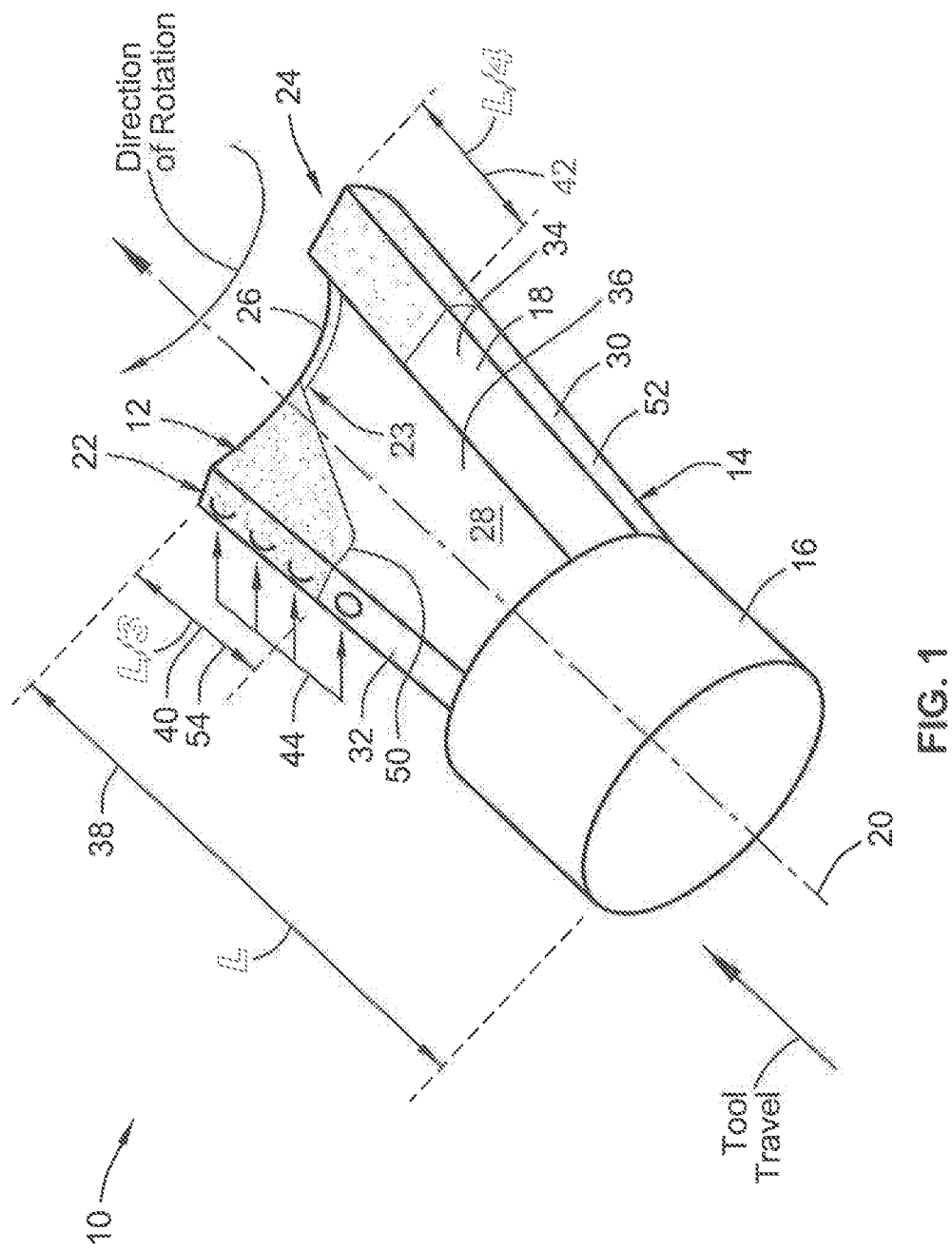
FIG. 1 is a partly schematic isometric view of a boring bit in accordance with an embodiment of the present invention.
Figure 2:
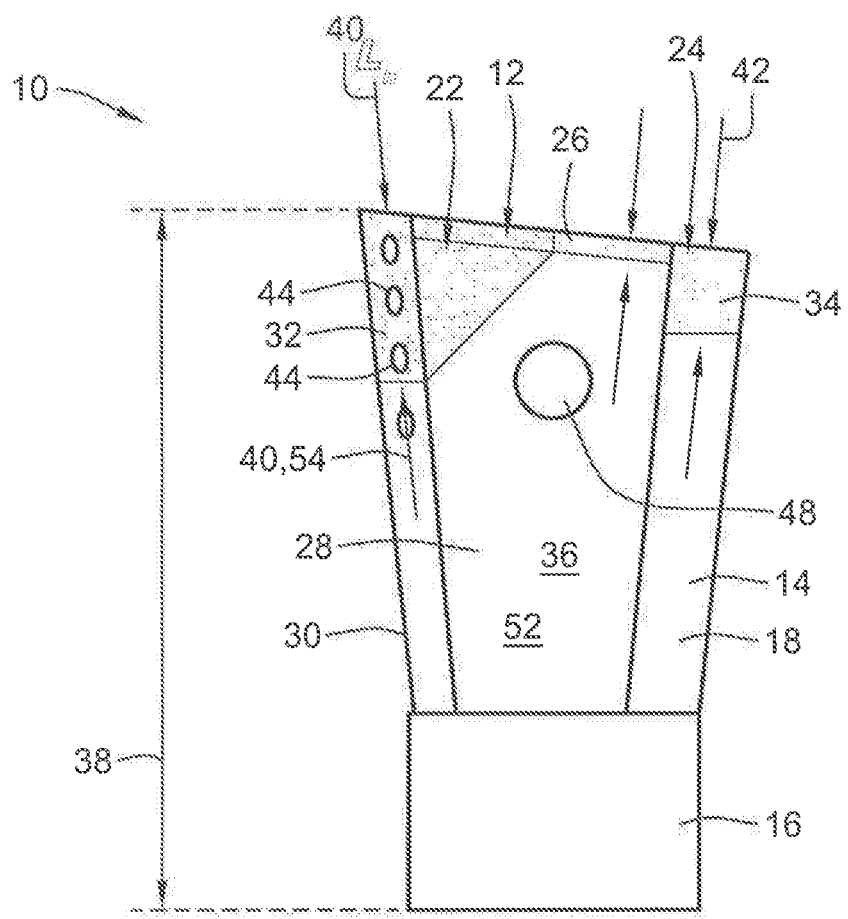
FIG. 2 is a partly schematic side view of the boring bit shown in FIG. 1.
Figure 3:
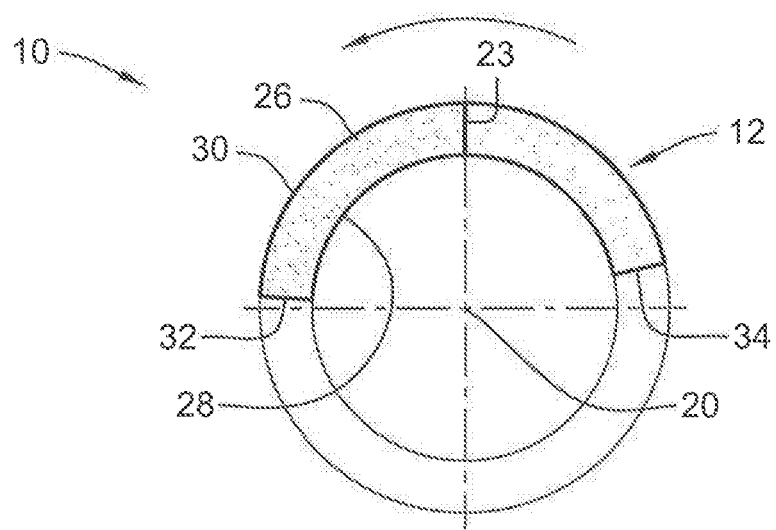
FIG. 3 is a partly schematic end view of the forward end of the boring bit shown in FIG. 1.

In contrast, the hard faced layer may be applied less to the trailing face 34 not only in thickness but also in length for protection of the trailing face a trailing axial length of between 15% and 35% of the maximum axial span. Preferably, the trailing axial length may be less than the leading axial length by at least 5% of the maximum axial span (probably closer to 20%-25%). This is even more so pronounced along the inner radial surface as shown in FIG. 1, where the span along the trailing region may only be 5-10% of the maximum axial length, with the leading region having at least double the area of coverage along the inner radial surface 28.

In these covered hard faced regions, there is substantially complete coverage meaning that preferably 95% coverage and most preferably 100% coverage of the regions schematically indicated with hard faced layer coverage in FIGS. 1-6. However, it is realized that substantially complete means at least 90% coverage meaning the unmodified original steel surface of the boring bit body 14 is at least 90% covered with the hard faced layer in the hard faced layer regions. This factor accounts for the fact that there may be small areas that for tolerance considerations or for other reasons may simply not be covered for one reason or another.

As also shown, typically at least the leading face 32 and often the front thrust surface 26 will comprise cutting teeth inserts 44 embedded therein. These cutting teeth inserts 44 are distinguished and not the same as the hard faced layer 12 but preformed members that are typically embedded such as via press fitting, welding, brazing or the like directly into the steel material of the boring bit body 14.

As with other structures typically provided in the boring bit 10, it is shown that the engagement bit portion 16 may define slurry injection ports 46 that are proximate the front thrust surface 26 as well as a through hitch aperture 48. The through hitch aperture 48 provides a hook point by which a bit can be manipulated mechanically such as via a chain or other structure to facilitate manipulation of the bit such as when outside of the earth bore and/or to pull the boring bit out of a borehole. The slurry injection ports 46 on the other hand are not used for manipulation of the bit but instead receive suitable fluid such as slurry injection liquid that assists in removal of earth substrate material as well as a lubricating fluid to carry away frictional heat generated during boring operations. Injection slurry liquid can be pushed through the ports and then evacuated through the center of the bit during operation.

Preferably, the hard faced layer 12 encompasses these slurry injection ports sufficiently for protection thereof as illustrated and extends to a location axially below the slurry injection ports with substantially complete coverage of the hard faced layer over a region from the thrust surface to a location below the slurry injection ports 46.

Additionally, the coverage of the hard faced layer 12 also preferably extends to a location immediately below the through hitch aperture 48.

In an embodiment, it is seen that a border 50 is created at the location where the hard faced layer 12 stops with the remainder of the boring bit body 14 comprising exposed unmodified original external steel material of the boring bit body 14 in an exposed region that extends over an uncovered portion of the engagement bit portion 18 as well as typically the entire mounting base portion 16. This border preferably extends a maximum axial span from the thrust surface 26 to this border 50 a maximum axial border length of between 25% and 45% of maximum axial span 38.

Most typically, the boring bit body 10 is formed from steel material while the cutting teeth inserts 44 that are embedded in the steel material are formed most conventionally from a carbide material. As shown schematically for example in FIG. 1, select carbide inserts may be completely or at least substantially completely overlapped by the hard faced layer. Thus as shown in FIG. 1 for example, the hard faced layer which comprises a bead of laser cladding is in substantially complete overlapping relation of the cutting teeth inserts 44. The lowest cutting teeth insert may not be overlapped at all, but for the cutting teeth inserts that are covered, those may be covered with laser cladding in substantially complete overlapping relation. This is shown best, for example, also in FIG. 11 showing the carbide insert that is completely overlapped by laser clad material.

Figure 6:
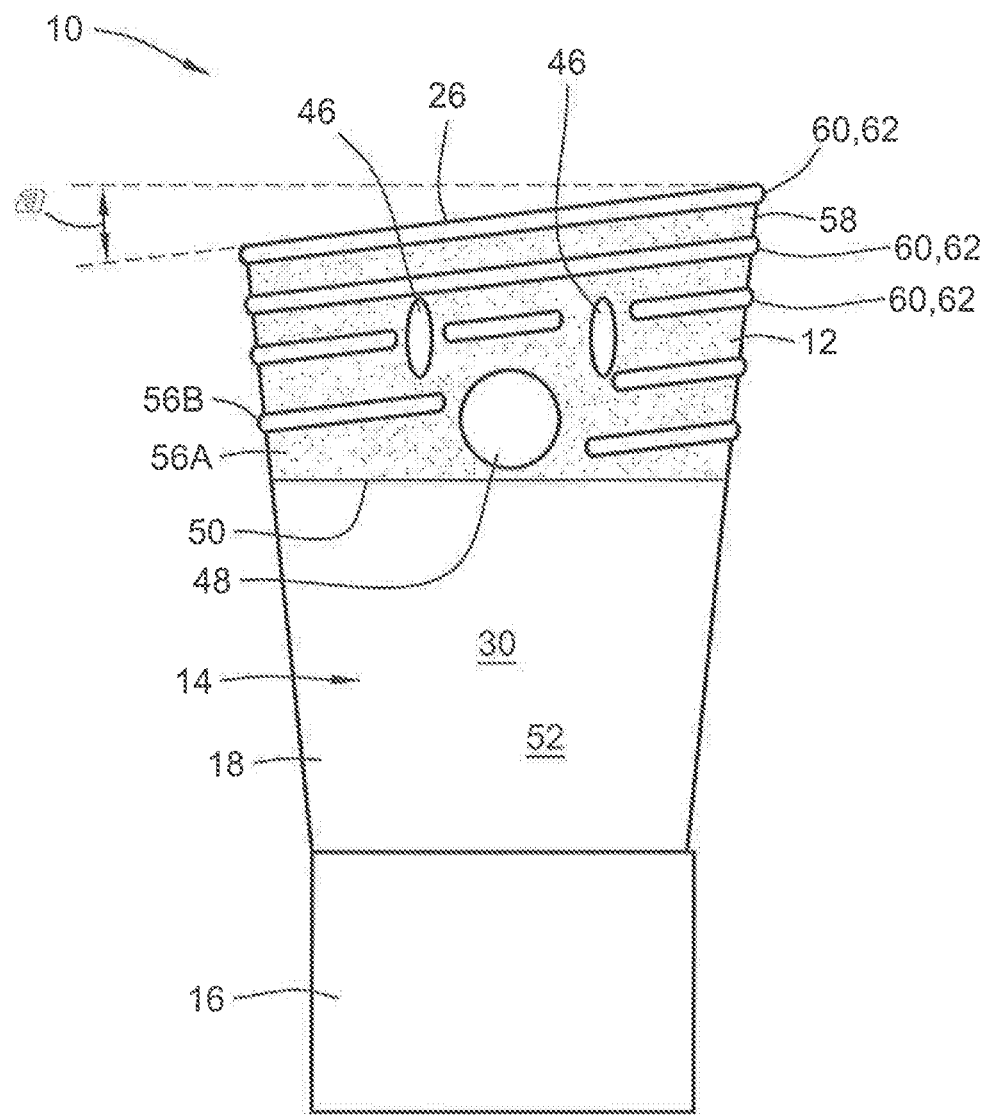
FIG. 6 is a partly schematic side view of a further embodiment of a boring bit similar to the embodiment shown in FIG. 1 (as such like reference numbers are used) but with additionally substantially complete overlapping feature and/or spaced hard faced beads that complement the shape of the boring bit relative to direction of travel.
Figure 9:
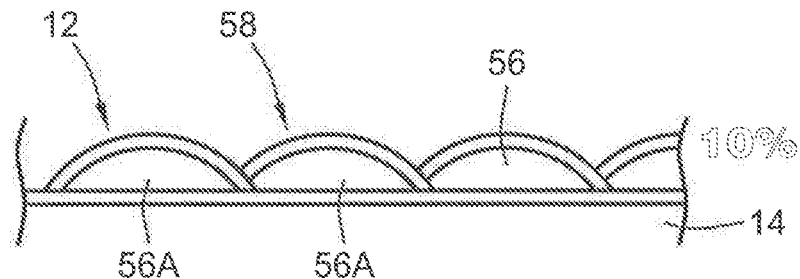
FIGS. 9, 10 and 11 are partly schematic cross-section views taken through a surface of the hard face layer as applied to the surface of the boring bit body showing partial edge overlap (not to be confused with substantially complete overlap) of adjacently deposited laser clad beads with 10% edge overlap being indicated in FIG. 9, 50% edge overlap being indicated in FIG. 10, and 35% edge overlap being indicated in FIG. 11 with FIG. 11 additionally illustrating 100% coverage of an embedded carbide insert tooth embedded in the boring bit body.
Figure 10:
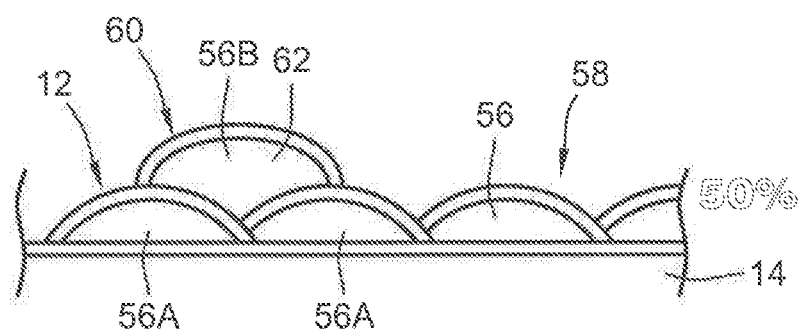
Figure 11:
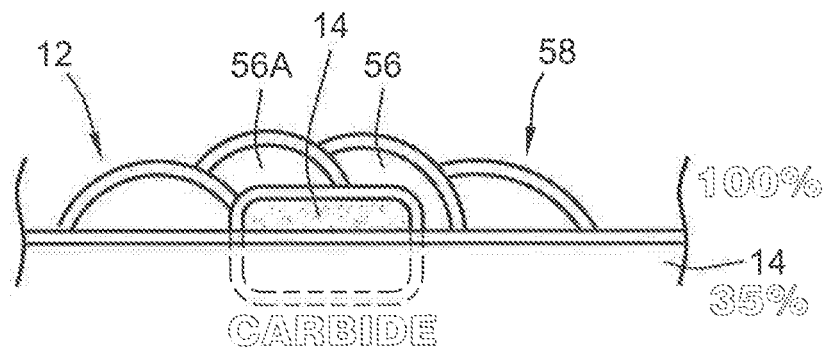

In some instances, the hard faced layer 12 may be only one layer thick such as shown for example in FIGS. 9 and 11 and demonstrated for example in the embodiment of FIGS. 1-5 schematically. However, as shown with reference to FIG. 6 and also demonstrated in FIG. 10, the hard faced layer may be at least two layers thick in at least some regions. For example, the hard faced layer 12 may be formed from a laser cladding bead 56. In some regions 58 the laser clad bead 56 and therefore the hard faced layer 12 may be only one layer thick in one layer thick region 58 while it may be at least two layers thick in an overlapped region 60 where the laser cladding bead 56 is deposited upon itself in substantially complete overlapping relation. This means that it is at least 90% overlapping not merely at the edges of the bead where partial overlap typically occurs. Therefore, with reference to FIGS. 9-11, laser cladding bead segments 56A are shown to be not substantially complete overlapping relation while bead 56B shown in FIG. 10 as well as in FIG. 6 is shown to be in substantially complete overlapping relation. Where merely the edges of the bead overlap, that is considered to be one layer thick as illustrated.

Figure 7:
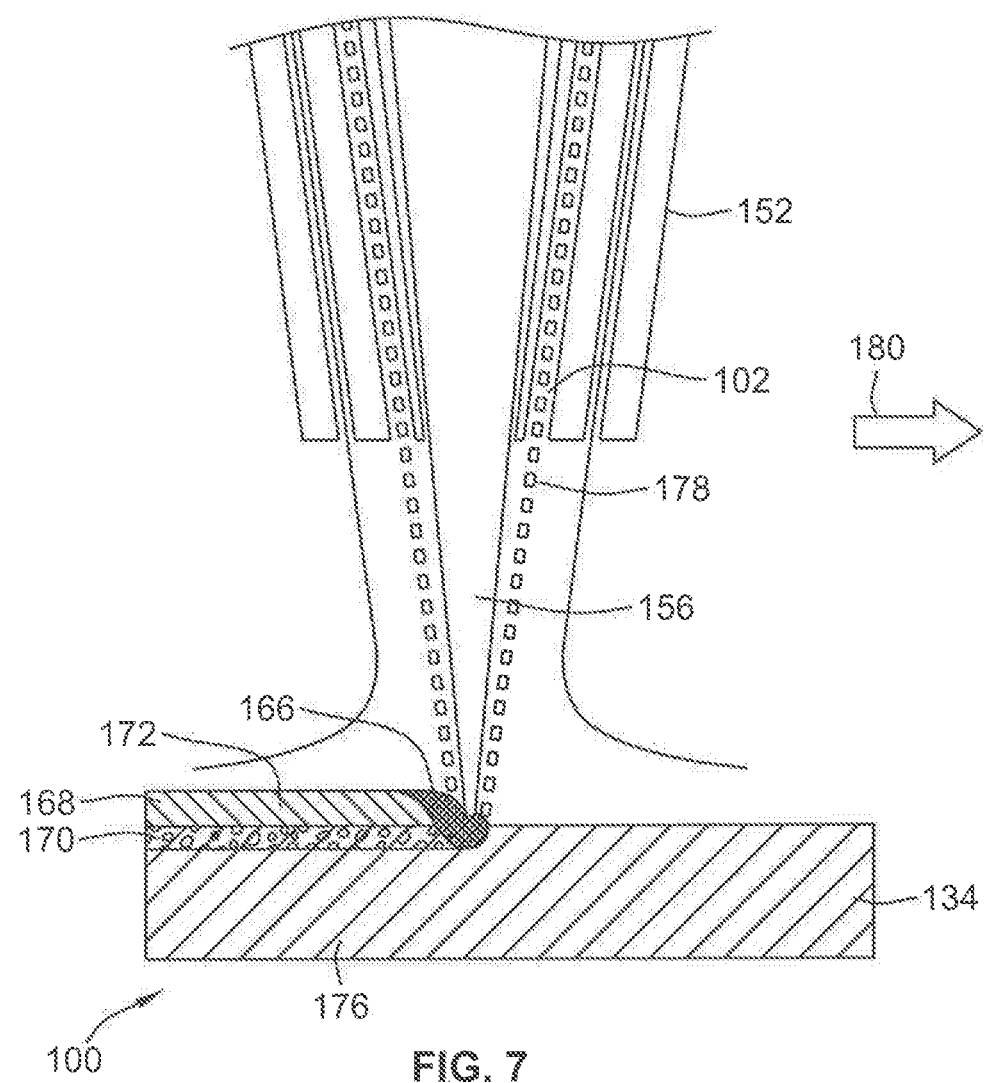
FIG. 7 is an exaggerated schematic cross section taken normal through a single layer cladded surface of the boring bit and further schematically illustrates the cladding tool used to create the structures created in and on the boring bit body as a result of the cladding process.

Preferably, the hard faced layer 12 is formed by the laser cladding bead 56, with methodology for forming such a laser cladding bead 56 being discussed in relation to FIGS. 7 and 8 where it is understood that these depict a cross-section through a portion of the boring bit body, but not to scale, with the resulting surface then being indicated with respect to FIGS. 1-6 embodiments.

Turning now to FIGS. 7 and 8, FIG. 7, schematically illustrates the laser cladding method of certain embodiments of the invention and its effect during the laser cladding process on the steel base material 176 to create the boring bit 10 (as shown in FIG. 1). Specifically, the cross sectional area shown in FIG. 8 is that area taken through a cut normal to a cladded surface of the boring bit. FIG. 8 illustrates the structures remaining within and on the base material after the laser clad material 102 has been deposited.

In general, laser cladding is the process of cladding material with the desired properties and fusing it onto the substrate by means of a laser beam. Laser cladding can yield surface layers that when compared to other hard facing techniques or standard base steel material and can have superior properties in terms of hardness, bonding, corrosion resistance and microstructure.

In an embodiment of the present invention, laser cladding technology is utilized in a method to deposit the cladding on and into the external bore bit surface with the laser cladding tool/laser 152 and thereby metallurgically bond the cladding material 102 to the base material 176. The laser 152 may include using at least one of the following lasers; $CO_2$, YAG, Diode and fiber. A laser beam 156 is created by the laser tool 152 and consists of a column of light energy of similar wave length. These different types of lasers produce different wave lengths of light. These lasers each have their own unique characteristics, but all work well in the method described herein. The foregoing lasers are not meant to be limiting examples as other lasers can be used.

As illustrated in FIG. 7, the laser 152 creates a shallow melt pool 166 of the base material. The cladding material 102 is comprised of particles 178 that are introduced into the melt pool 166 in powder form. The energy from the laser 152 subsequently melts binding materials of the cladding material 102. After solidification of the melt pool 166 a dilution zone 170 remains wherein true metallurgical bond affixing the particles 178 of the clad material 102 and the base material 176 remains under and a deposition zone 168 comprising only the laser clad material 102. Preferably the dilution zone 170 has a dilution zone thickness 171 that is less than 0.5 millimeters and more preferably less than 0.3 millimeters thick.

Typically the hard/wear resistant laser clad material 102 referred to in various embodiments of the invention is material composed of a medium to high percentage of hard particles. These hard particles can be: Tungsten Carbide, Titanium Carbide, Chrome Carbide, Iron Carbide, Diamond, Ceramics, or any other high hardness particles in the range of HV 1000-2500 (Vickers scale hardness). The high hardness particles are then bonded and held in place to the base material through the metallurgical bond. In the alternative to carbides, powders of various metal alloys or other amorphous materials may be laser clad or otherwise deposited according to embodiments of the present invention. Carbide alternatives as envisioned or discloses in U.S. Pat. No. 6,887,586 or U.S. RE 29,989 (see also U.S. Pat. No. 3,871,836), the entire teachings and disclosures of which are incorporated herein by reference.

As discussed above, when the clad material 102 is deposited into the base material 176 of the external bore bit surface 134 it forms the deposition zone 168 over the dilution zone 170. The deposition zone 168 (which is primarily particles and greater than 50% particles) formed of the laser clad material 102 forms a material bead 172 that extends normal to the surface of the base material. Preferably, the material bead 172 has an average thickness 173 between 1 millimeters and 6 millimeters and more preferably between 2 and 4 millimeters. The added thickness is measured as the increased thickness resulting from the laser clad deposition on the underlying surface to which it is applied.

The dilution zone 170 contains base material 176 intermixed with particles 178 of the clad material 102 but may be 50% or more base material. The particles 178 of the clad material 102 are of a second hardness greater than the first hardness of the base material 176. The particles 178 of the clad material 102 preferably have an average size of between 40 µm and 250 µm and more preferably between 44 µm and 105 µm. In another embodiment, amorphous cladding may be applied with hard particles precipitating during the process.

Turning to FIG. 6, it is understood this is the same as the embodiment of FIGS. 1-5 but with the added feature of the laser cladding bead 56 forming axially spaced apart and circumferentially extending laser clad bead segments that extend along the outer radial surface 30 of the engagement bit portion 18. In this embodiment, segments 62 are shown as disconnected but they may also be interconnected. In either case, such laser clad segments 62 are preferably formed to form a spiral path around the body toward the front thrust surface 26 with each of the segments 62 being laid upon a path that is approximately parallel with the front thrust surface 26 (approximately parallel meaning parallel or within 10° of parallel).

In these overlap locations, the boring bit body 14 may receive a coating roughly double the thickness of the main body coating as demonstrated for example by laser clad bead 56B upon 56A as shown in FIG. 10. It is noted that these additional bead segments 62 are applied strategically around the slurry injection ports 46 to provide additional protection thereto but are spaced from those ports by at least 2 mm but less than 20 mm. For example approximately 6 mm in an embodiment. By being arranged in the spiral path, this may also have advantages during engagement to help assist or follow the rotational path of engagement while also facilitating flow of slurry fluid. While laser clad bead segments 62 may be interconnected, more preferably the segments 62 are discreetly laid and not interconnected. Thus they may or may not be interconnected in alternative embodiments.

Figure 12:
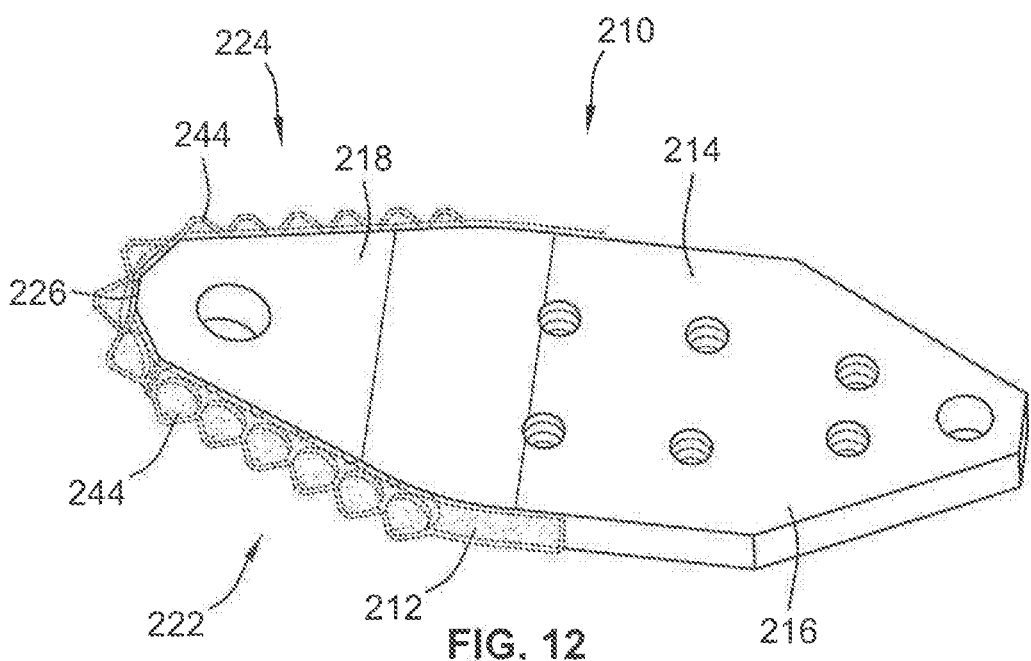
FIGS. 12, 13 and 14 are partly schematic isometric, edge side and top side views, respectively, of a duckbill boring bit in accordance with another embodiment of the present invention schematically indicating cladding applied over inserts along at least part of the edge thickness.
Figure 13:
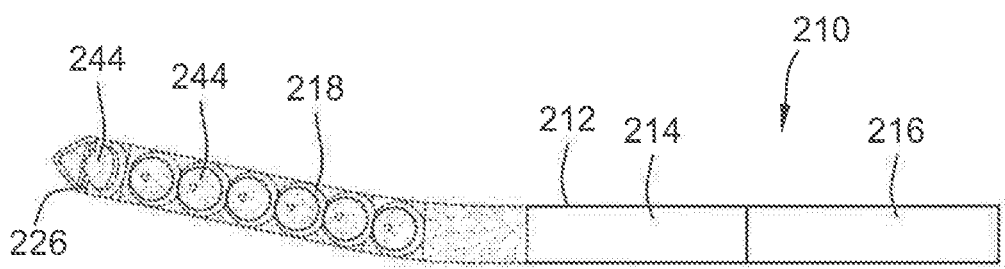
Figure 14:
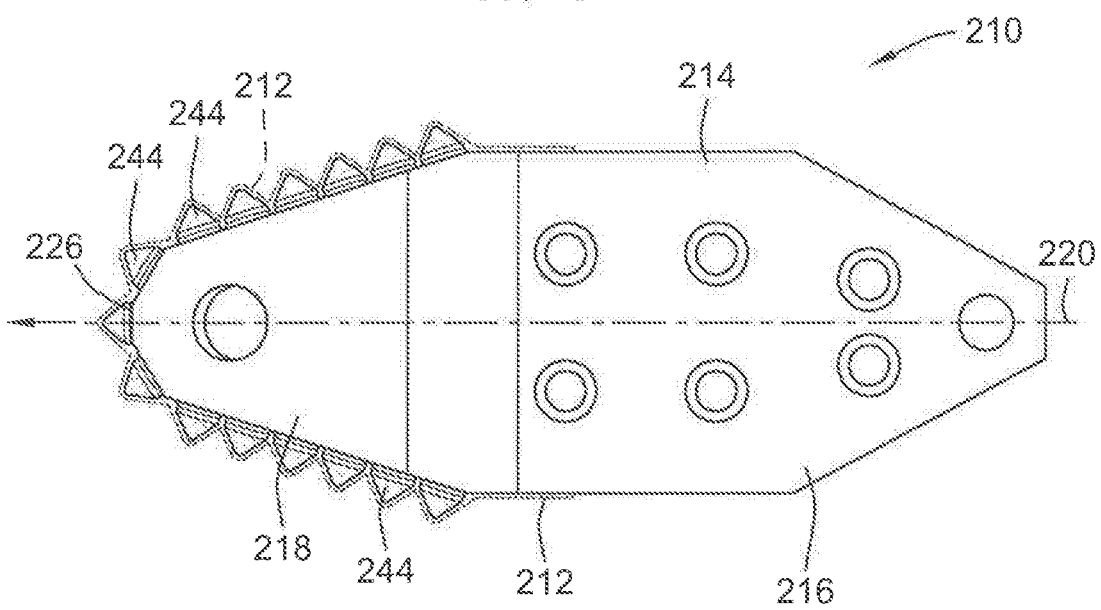

Turning to FIG. 12-14 a second illustrated embodiment of the present invention is illustrated as a boring bit 210 that may include and comprise any of the hard face features such as by laser cladding of the first embodiment (including heavier or lighter portions or selective regions), such that the teachings and disclosure of the first embodiment are applicable to the second embodiment. The second embodiment demonstrates that the bit configuration may be different and is envisioned. It should also be kept in mind that beyond cutting bits, other bits are contemplated in additional embodiments such as for scraping, cutting and boring, with the illustrated embodiments capable of doing one or more of those functions.

As such, like reference numbers will be used for this embodiment using the two-hundred number series to correspond to FIGS. 12-14. For example, this second embodiment includes teeth inserts 244 (the teeth inserts comprising carbide material) that are embedded in a boring bit body 214, and that are at least partially overlapped by a hard face layer 212 (and preferably a laser cladding type hard face layer).

For example, and with additional reference to FIGS. 7 and 8, the hard face layer 212 can be a laser cladding formed by laser cladding the laser clad bead 172 over the carbide teach inserts 244, preferably with an average thickness 173 between 1 millimeters and 6 millimeters and more preferably between 2 and 4 millimeters. The added thickness is measured as the increased thickness resulting from the laser clad deposition on the underlying surface to which it is applied. Also as describe in relation to FIGS. 7 and 8, as applied to this present embodiment of FIGS. 12-14, the resulting dilution zone 170 has a dilution zone thickness 171 that is less than 0.5 millimeters and more preferably less than 0.3 millimeters thick (both for the iron or steel base material and/or the carbide teeth insert material).

The particular boring bit 210 is a duckbill type for the boring bit body 214 that comprises a first material having a first hardness such as steel material which is conventionally used in such boring bits. Over part of the boring bit body 214 that may be only along the thickness edge is the hard face layer 214 has a significantly greater second hardness than the steel material of the boring bit body 210 to provide for enhanced lifespan and/or better wearability. As shown, the boring bit body 214 generally comprises a mounting base portion 216 and an engagement bit portion 218.

The mounting base portion 216 facilitates attachment and mounting to a suitable axial drive shaft and rotary actuator. For the duckbill type bit 210 typically there is an intermediate mounting piece (not shown) between the bit 210 and the rotary drive shaft, which may be considered in this embodiment to be part of the bit. To facilitate mounting, mounting holes may be provided to receive fasteners such as bolts. Further, larger holes at the forward and rear ends may be provide to provide hook points similar to that in the first embodiment.

It is noted that this bit may be used alone, and in some larger bit embodiments multiple bits may be provided among a common mounting hub, each of which is configured to move forward or rearward and to be rotated about the travel axis.

The engagement bit portion 218 is configured for boring engagement in an earth substrate material to create the bore therethrough. The engagement bit portion 218 extends axially forward from the mounting base portion 216 about a central travel axis 220. Generally, the engagement bit portion 218 defines a leading region 222 that is arranged at the leading surface that initially engages the earth material during rotation, and a trailing region 224 that is disposed rotationally behind the leading region relative to the central travel axis. When the boring bit is rotated in on direction about the central travel axis 220, the leading region 222 will first engage and cut against the earth substrate to be followed by the trailing region 224. However, this bit is also bi-directional such that the bit can also be rotated in the reverse direction in which the leading region 222 becomes then the trailing region and the trailing region 224 becomes the leading region. Thus, this bit 210 is different from the first embodiment where there is a predetermined rotational direction for normal operation.

Like the first embodiment, the hard faced layer 212 is integrally bonded to the boring bit body 14 over the steel base material thereof, but in this case only along the thickness edge regions (including leading region 222, trailing region 224 and front thrust surface 226) as illustrated such that most (e.g. 90% or more) of the top and bottom surfaces are not laser clad with hard facing with the raw steel surface exposed. Here, the laser cladding of the hard face layer is also formed over the carbide insert teeth 244 along these thickness edge regions.

As schematically indicated in FIGS. 12-14, and like the first embodiment, cutting teeth inserts comprising a carbide material, are embedded in the steel material along at least one of a leading face of the leading region 222 and a front thrust surface 226. The hard face layer 212 is also integrally bonded to the boring bit body 214 over the first steel material, to provide a harder second material having a second hardness greater than the first hardness.

The process and description applied to the first embodiment and in relation to FIGS. 7-11 are equally applicable to that of FIGS. 12-14 as will be readily understood to one of skill in the art.

As such, in relation to an aspect of overcladding inserts of any of the illustrated embodiments discussed herein, a method of manufacturing a bit is provided. This method comprises cladding a hard face layer over part of a bit body, with the bit body comprising a first material having a first hardness. For example, the first material comprises steel material. The bit body comprises a mounting base portion and an engagement bit portion, with the engagement bit portion extending axially forward from the mounting base portion. The hard face layer comprising a second material having a second hardness greater than the first hardness. The method also involves cladding the hard face layer at least partially over at least some of a plurality of teeth inserts. The teeth inserts comprise a carbide material and are embedded in the steel material along the engagement bit portion.

Preferably, the cladding of the base steel material and the cladding of the teeth inserts are done in one continuous step although discontinuous steps are contemplated.

In the methodology, the cladding the hard face layer can be done in a process simultaneously over both the teeth inserts and the bit body in a region adjacent the teeth inserts to slow erosion of the steel material in the region.

Preferably and as shown in FIG. 11 cladding the hard face layer over the teeth inserts completely covers the teeth inserts.

Also preferably, all cutting teeth are at least partially covered with cladding such as shown in the embodiment of FIGS. 12-14, but as shown for FIG. 1, some of the teeth may also not be clad over. Depending on the application and intent, the cutting teeth may have 0-100% coverage Preferably, the cladding is conducted with a laser cladding operation over the metal and the carbides such as described in conjunction with FIGS. 7-11.

Figure 15:
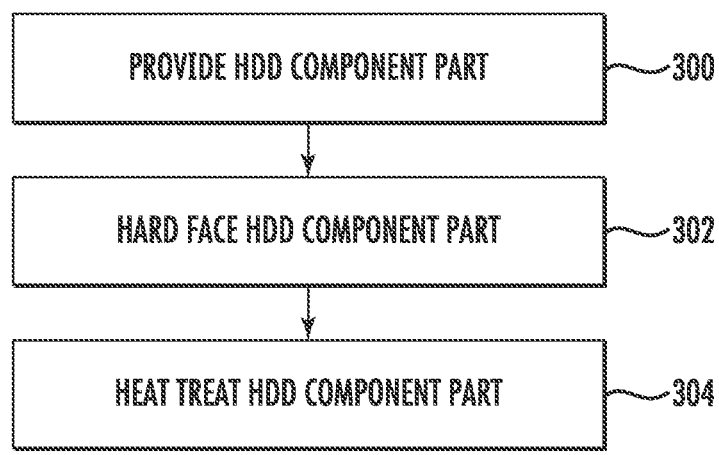
FIG. 15 is a method diagram of a sequential process for making a hard faced and subsequently heat treated HDD component part.
Figure 16:
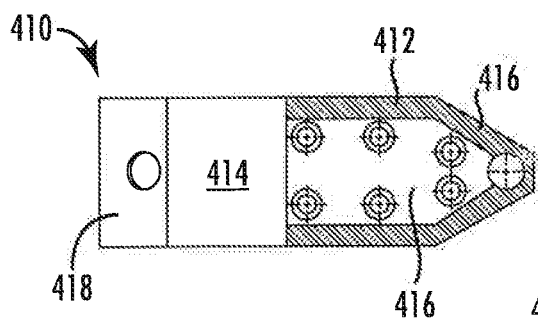
FIGS. 16-20 are bottom, right side, left side, back end, front end views of a HDD component part illustrated as a directional drilling bit, with hard face regions being illustrated schematically.
Figure 17:
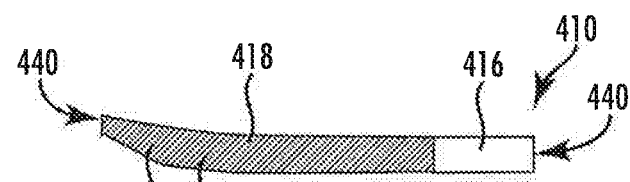
Figure 18:
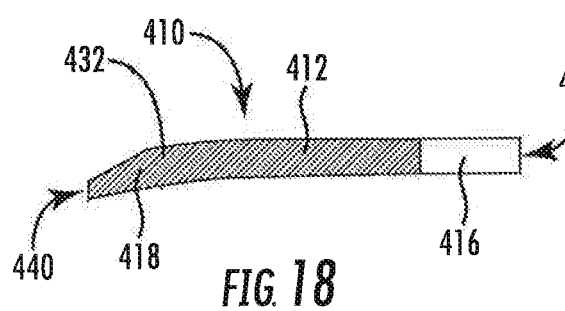
Figure 19:
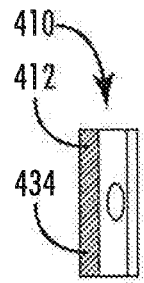
Figure 20:
Figure 21:
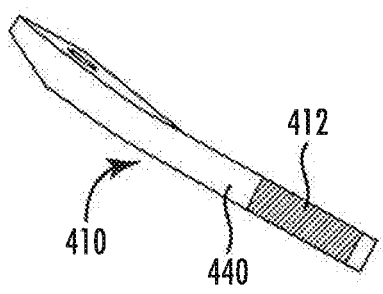
Figure 22:
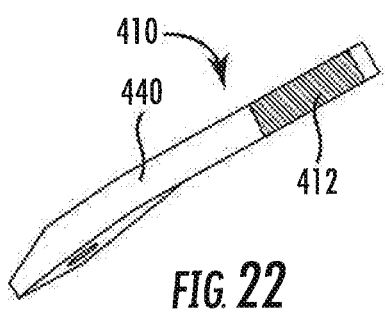
FIGS. 22-24 are additional views of the directional drilling bit shown in FIGS. 17-21, with FIG. 24 illustrating the top side, and with hard face regions being illustrated schematically.
Figure 23:
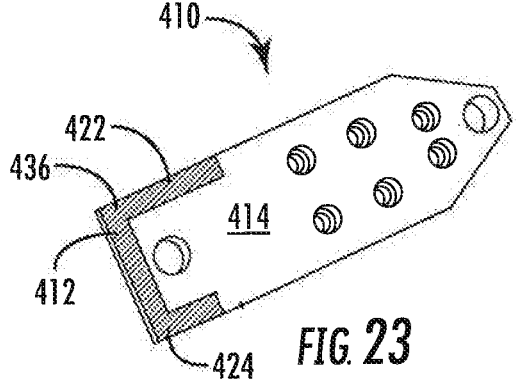
Figure 24:
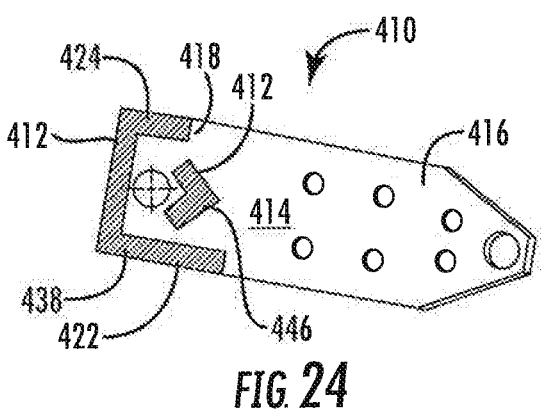

Another embodiment, which is illustrated as another form of a horizontal directional drilling (HDD) component in the form of directional drilling bit 410 is illustrated in FIGS. 16-24, which has been subjected to the treatment process of FIG. 15 including the hard facing and then subsequent heat treatment. This bit 410 is illustrated to show that the process can also create an "insert free" type bit that does not have carbide teeth inserts like the previous embodiment.

The particular boring bit 410 is illustrated as a flat/sand type bit with a boring bit body 414 that comprises a first material having a first hardness such as steel material which is conventionally used in such boring bits. Over part of the boring bit body 414 the hard face layer 412 has a significantly greater second hardness than the steel material of the boring bit body 414 to provide for enhanced lifespan and/or better wearability. As shown, the boring bit body 414 generally comprises a mounting base portion 416 and an engagement bit portion 418. While a boring bit 410 is illustrated as steel base material, alternatively bits or other bit components can be made from iron base material. Base material of the part to be clad may be steel base material, or iron base material is also contemplated for such bits or components therefore (e.g. ductile iron and/or grey iron such as a casting).

The mounting base portion 416 facilitates attachment and mounting to a suitable axial drive shaft and rotary actuator. For the duckbill type bit 410 typically there is an intermediate mounting piece (not shown) between the bit 410 and the rotary drive shaft, which may be considered in this embodiment to be part of the bit, and which HDD component part may also be subject to the processing steps indicated in FIG. 15. To facilitate mounting, mounting holes may be provided to receive fasteners such as bolts. Further, larger holes at the forward and rear ends may be provide to provide hook points similar to that in the earlier embodiment.

The engagement bit portion 418 is configured for boring engagement in an earth substrate material to create the bore therethrough. The engagement bit portion 418 extends axially forward from the mounting base portion 416 about a central travel axis 420. Generally, the engagement bit portion 418 defines a leading region 422 that is arranged at the leading surface that initially engages the earth material during rotation, and a trailing region 424 that is disposed rotationally behind the leading region relative to the central travel axis. When the boring bit is rotated in on direction about the central travel axis 420, the leading region 422 will first engage and cut against the earth substrate to be followed by the trailing region 424. However, this bit is also bi-directional such that the bit can also be rotated in the reverse direction in which the leading region 422 becomes then the trailing region and the trailing region 424 becomes the leading region.

The hard face layer 412 (preferably laser cladding, but alternatively PTA hard face coating, welded hard face coating, or mechanically bonded coating) is first applied via step 302 indicated in FIG. 15, and then subsequent the entire bit 412 has been heat treated according to step 304 in FIG. 15 according to one of the heat treatment options mentioned above.

Referring to FIGS. 16-24, the leading and trailing regions 422, 424 are coated with the hard face layer 412, and in this case the treatment is not only along the leading/trailing hard face engagement edges 430, 432, and tip engagement edge 434, but also along top and bottom surfaces in hard face adjacent regions 436, 438 on top and bottom regions. Additionally, hard facing may be applied to most (80 percent or more) or preferably all as illustrated of the entire material thickness edge 440. Further hard face region 442 can be provided along mounting base portion 416 around mounting holes, and around hook port with protective region 446 on the top and/or bottom side.

Once the hard facing is applied at these regions, then the heat treatment is applied, such as austemper heat treatment, although it may alternatively involve a martemper or marquench, or a quench and temper. This can remove potential soft spots in heat affected zones (HAZ) (if any) created by the hard face application. Further, if laser cladding is performed, soft spots may not be created but a laser hardening effect may be realized in the base material. Never-the-less, additional heat treatment adds to the overall hardness and longevity of the steel or iron base material including any exposed regions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for hardening a horizontal directional drilling (HDD) component, comprising:
    hard facing the horizontal directional drilling (HDD) component at a region thereof, wherein the horizontal directional drilling (HDD) component comprises a boring bit, wherein the boring bit comprises a mounting base portion and an engagement bit portion extending axially forward from the mounting base portion, wherein a front thrust surface is along the engagement bit portion at an axially front-most location facing away from the mounting base portion, and wherein said hard facing covers at least 90% of the front thrust surface; and then subsequently
    heat treating the hard faced horizontal directional drilling (HDD) component.

2. The method of claim 1, wherein the hard facing comprises:
    melting a base material with a laser to form a melt pool;
    depositing a stream of particles of a clad material into the melt pool; and
    solidifying the melt pool to affix the particles of the clad material.

3. The method of claim 1, wherein the hard facing creates a heat affected zone (HAZ) in a steel base material or iron base material of the horizontal directional drilling (HDD) component, wherein the heat treating removes the heat affected zone (HAZ).

4. The method of claim 1, wherein the hard facing comprises a laser clad hard face coating.

5. The method of claim 4, wherein the laser clad hard face coating has a coating hardness of greater than 50 HRC.

6. The method of claim 4, wherein the laser clad hard face coating comprises a matrix primarily of nickel and tungsten.

7. The method of claim 1, wherein claim (1) the hard facing is comprises a Plasma transferred arc (PTA) hard facing.

8. The method of claim 7, wherein the Plasma transferred arc (PTA) hard facing has a coating hardness of greater than 50 HRC.

9. The method of claim 1, wherein claim (1) the hard facing comprises a welded hard face coating.

10. The method of claim 9, wherein the welded hard face coating has a coating hardness of greater than 50 HRC.

11. The method of claim 1, wherein the hard facing comprises a mechanically bonded coating.

12. The method of claim 11, wherein the mechanically bonded coating comprises a coating hardness of greater than 50 HRC.

13. The method of claim 1, wherein the heat treating comprises an austemper heat treatment.

14. The method of claim 13, further comprising a microstructure that is primarily bainitic having a hardness within the range of 35-65 HRC.

15. The method of claim 1, wherein the heat treating comprises a Martemper or Marquench.

16. The method of claim 15, further comprising a microstructure that is primarily tempered martensite with bainitic formations possible having a hardness within the range of 35-65 HRC.

17. The method of claim 1, wherein the heat treating comprises a quench and temper.

18. The method of claim 17, further comprising a microstructure that is primarily tempered martensite having a hardness within the range of 35-65 HRC.

19. The method of claim 1, wherein the hard facing is covering (seat belting) a carbide insert mounted in a steel base material or iron base material of the horizontal directional drilling (HDD) component, and wherein the hard facing is applied to an engagement surface of a directional drilling bit.

20. The method of claim 1, wherein the steel base material or iron base material is free of carbide teeth inserts, and wherein the hard facing is applied to an engagement surface of a directional drilling bit.

21. A horizontal directional drilling (HDD) component manufactured according to the method of claim 1.

22. The method of claim 1, wherein the boring bit is a duckbill type bit.

23. The method of claim 1, wherein the boring bit is a flat type bit.

24. A method for hardening a horizontal directional drilling (HDD) component, comprising:
    hard facing the horizontal directional drilling (HDD) component at a region thereof, wherein the horizontal directional drilling (HDD) component comprises a boring bit, wherein the boring bit comprises:
    a mounting base portion, and
    an engagement bit portion extending axially forward from the mounting base portion about a central travel axis, the engagement bit portion defining a leading region arranged at a leading surface configured to initially engage the earth material during rotation, and a trailing region arranged at a trailing surface disposed rotationally behind the leading region relative to the central travel axis, with (a) an inner radial surface that extends between the leading and trailing surfaces and faces toward the central travel axis and extends from a front thrust surface toward the mounting base portion, and (b) an outer radial surface that faces away from the central travel axis; and then subsequently
    heat treating the hard faced horizontal directional drilling (HDD) component.

25. The method of claim 1, wherein the boring bit defines a through hitch aperture therethrough providing a hook point by which a bit can be manipulated mechanically.

26. The method of claim 1, wherein the boring bit is a cobble bit.

27. A method for hardening a horizontal directional drilling (HDD) component, comprising:
    hard facing the horizontal directional drilling (HDD) component at a region thereof, wherein the horizontal directional drilling (HDD) component comprises a boring bit, wherein the boring bit comprises:
    a mounting base portion defining respective flat regions on opposite sides thereof connected by a peripheral edge traversing therebetween, the mounting base portion defining mounting holes, and an engagement bit portion defining respective flat regions on opposite sides thereof connected by the peripheral edge region, the engagement bit portion extending axially forward from the mounting base portion about a central travel axis; and then subsequently heat treating the hard faced horizontal directional drilling (HDD) component.

* * * * *

UNITED STATES PATENT AND TRADEMARK OFFICE
CERTIFICATE OF CORRECTION

PATENT NO. : 11,987,889 B2
APPLICATION NO. : 16/833555
DATED : May 21, 2024
INVENTOR(S) : Keith A. Johnson et al.

It is certified that error appears in the above-identified patent and that said Letters Patent is hereby corrected as shown below:

In the Claims

Column 18, Claim 19, Line 18; Replace: "covering (seat belting) a carbide insert mounted in a steel" with --covering a carbide insert mounted in a steel--

Signed and Sealed this
Second Day of July, 2024

Katherine Kelly Vidal
*Director of the United States Patent and Trademark Office*